United States Patent
Balay et al.

(10) Patent No.: US 7,116,665 B2
(45) Date of Patent: Oct. 3, 2006

(54) METHODS AND SYSTEMS FOR A DISTRIBUTED PROVIDER EDGE

(75) Inventors: Rajesh Balay, Sunnyvale, CA (US);
Vijay Srinivasan, Palo Alto, CA (US);
Sanjeev Tyagi, Santa Clara, CA (US);
Pasula Srinivasa Reddy, Palo Alto, CA (US); Chandramouli Sargor, Sunnyvale, CA (US); John Crawbuck, Pleasanton, CA (US)

(73) Assignee: Fortinet, Inc., Sunnyvale, CA (US)

( * ) Notice: Subject to any disclaimer, the term of this patent is extended or adjusted under 35 U.S.C. 154(b) by 1088 days.

(21) Appl. No.: 10/163,073

(22) Filed: Jun. 4, 2002

(65) Prior Publication Data
US 2003/0223406 A1 Dec. 4, 2003

(51) Int. Cl.
*H04L 12/56* (2006.01)
(52) U.S. Cl. ............... 370/392; 370/395.31; 370/395.5
(58) Field of Classification Search ............... 370/392, 370/395.31, 395.5
See application file for complete search history.

(56) References Cited

U.S. PATENT DOCUMENTS

| | | | |
|---|---|---|---|
| 6,938,095 B1 * | 8/2005 | Basturk et al. | 709/238 |
| 6,999,454 B1 * | 2/2006 | Crump | 370/389 |
| 2002/0126671 A1 * | 9/2002 | Ellis et al. | 370/390 |
| 2003/0185226 A1 * | 10/2003 | Tang et al. | 370/428 |
| 2005/0188106 A1 * | 8/2005 | Pirbhai et al. | 709/238 |
| 2006/0140185 A1 * | 6/2006 | Norman et al. | 370/389 |

* cited by examiner

*Primary Examiner*—Hassan Kizou
*Assistant Examiner*—Anthony Sol
(74) *Attorney, Agent, or Firm*—Hamilton & DeSanctis

(57) ABSTRACT

Methods and Systems are provided for a distributed Provider Edge (PE). A single Virtual Routing and Forwarding device (VRF) is associated with a single customer site. The VRF includes a single routing table (RIB) and a single forwarding table (FIB). The VRF also includes a plurality of Virtual Private Network (VPN) Protocol Instance Modules (VRP), where each VRP is associated with a different VPN from the customer site. Each VRP accesses the RIB directly and the FIB indirectly to acquiring addressing/routing information for a received data packet. Moreover, each VRP uses a data plane of the VRP to communicate the data packets to a PE backbone device. In turn, the PE backbone device uses the data plane to communicate with each of the VRPs, and the PE backbone device communicates with one or more tunnels.

27 Claims, 4 Drawing Sheets

METHODS AND SYSTEMS FOR A DISTRIBUTED PROVIDER EDGE

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software descriptions/examples, and data as described below and in the drawings hereto: Copyright© 2002, Cosine Communications, Inc., All Rights Reserved.

FIELD OF THE INVENTION

The present invention is related to methods and systems for a distributed provider edge, more specifically methods and systems are provided to distribute and integrate provider edge technology.

BACKGROUND INFORMATION

In today's highly interconnected computing environments, a single customer can require a myriad of network configurations. For example, a customer can have internal networks called Intranets, external networks to other sites of the customer or to other organizations called Extranets, and the customer can have one or more Virtual Private Networks (VPNs). Each different VPN can be considered a separate network configuration. The customer can also have Internet network configurations to provide access to the World Wide Web (WWW).

Each network configuration (e.g., Intranet, Extranet, VPN, Internet, and others) will have its own data addressing scheme and policies that the customer must maintain and manage. As one of ordinary skill in the art readily appreciates this is not a trivial exercise. Moreover, often the customer may desire to have different network configuration interface with one another (e.g., an Extranet with an Intranet, and the like). This adds a layer of complexity in managing the customer's network configurations since the addressing schemes and policies between disparate network configurations are often not compatible with each other.

As a result, customers have turned to Service Providers (SPs) to manage and outsource the customers' networks. To do this, a customer's network site uses a customer edge device (CE). The CE can be any host computing device and/or a routing device for transferring network traffic from the customer's site to the SP. Network traffic occurs as data packets transmitted over a data link (e.g., Gigabit Ethernet (GigE), Frame Relay (FR), Time-Division Multiplexing (TDM), Asynchronous Transfer Mode (ATM), and others). The SP receives the data packets at a Provider Edge device (PE), which is another host computing device and/or routing device.

Typically, a customer will lease hardware from a SP, in order to manage the outsourced network configurations. The SP uses an Internet Protocol (IP) backbone to interface network traffic to the CE. Further, routing tables (RIBs) and forwarding tables (FIBs) are uniquely assigned to each of the customer's network configurations in order to effectively relay network traffic within the PE. Thus, the SP provisions separate routing devices for the customer to accommodate each of the customer's network configurations. As one of ordinary skill in the art readily appreciates, this becomes expensive for a customer, especially as the number of network configurations increase at the customer's site.

To address these problems, the Internet Engineering Task Force (IETF) promulgated a standard referred to as Request for Comments (RFC) number 2547 (RFC2547). RFC2547 defines methods by which a SP with an IP backbone can more efficiently provide VPNs (e.g., network configurations) for its customers. RFC2547 uses Multiprotocol Label Switching (MPLS) and Border Gateway Protocol (BGP) for distributing routes of network traffic over the IP backbone. Each network configuration (e.g., VPN) occurring within the SP's PE includes a Virtual Routing and Forwarding Module (VRFM) that has its own unique RIB and FIB for acquiring routes and forwarding data packets. The disparate RIBs, between VRFMs, exchange routes using BGP. VRFMs enable a VPN exchange using BGP to provide VPN routing. Data between the VRFMs is transmitted as labeled packets over a backbone tunnel.

Yet, RFC2547 requires a single unique RIB and FIB for each VPN. Moreover, a VPN interface (e.g., VPN communication protocol originating from a VPN site) that is associated with a VPN exchange communicates with a single VRFM. Thus, in RFC2547, each additional VPN interface requires a different instantiation of a VRFM to handle the additional VPN interface. Thus, each VRFM can support only one VPN. Furthermore, RFC2547 does not address how a VPN site can be enabled to access the Internet. As is readily apparent to one of ordinary skill in the art, these limitations impact the scalability of the RFC2547 standard since the mapping between the RIBs, FIBs, and VPN interfaces are symmetric with the VRFMs. Moreover, the features of the VRFMs cannot be distributed to other devices within the SP's PE.

Therefore, there is a need for improving existing PE methods and systems, so that the features of the RFC2547 standard and other VPN provisioning models can be fully utilized in a scalable fashion with a distributed PE. Such improvements can permit a single CE to communicate with a single PE over a single CE to PE interface channel while using a variety of disparate VPN. With such improvements, the VPNs can intercommunicate, as desired by the customer, within the distributed PE over a single CE to PE interface channel.

SUMMARY OF THE INVENTION

According to one aspect of the present invention, a distributed Provider Edge (PE) system is provided. The PE system includes, a PE backbone device, a Virtual Routing and Forwarding device (VRF), and a plurality of Virtual Private Network (VPN) Routing and Protocol Modules (VRPs) residing on the VRF. The PE backbone includes a data plane, and the VRF is associated with a single customer site having a single routing table (RIB) and forwarding table (FIB). Each VRP communicates directly with the RIB and indirectly with the FIB. Moreover, each VRP communicates with the PE backbone device through the data plane and each VRP is associated with a single customer VPN.

According to another aspect of the present invention, a method to process network traffic on a distributed PE, comprising: The PE receives a first data packet, and the first data packet is associated with a first VPN transaction from a customer site. Also, the PE receives a second data packet, where the second data packet is associated with a second VPN transaction from the customer site. The first data packet is associated with a first VRP, and the first VRP resides on a VRF. Further, the second data packet is associated with a second VRP, where the second VRP resides on the VRF. The first VRP accesses a single RIB and FIB located on the VRF to acquire first addressing information for the first data packet. The second VRP accesses the RIB and FIB located on the VRF to acquire second addressing information for the second data packet. The VRPs use a data plane associated with the VRF to communicate the first and second data packets to a PE backbone device.

DESCRIPTION OF THE PREFERRED EMBODIMENTS

In the following detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Various embodiments of the present invention utilize some aspects of the RFC2547 standard and other VPN provisioning modules (e.g., Provider Provisioned VPN Framework (PPVPN-FRMWRK). Moreover, BGP is used with various embodiments of the present invention to communicate imported and exported routes acquired from VPN Protocol Instance Modules (VRPs) (e.g., via the RIB) to PE backbone devices. The PE backbone devices access tunnels or Internet connections and communicate the routes to other PE systems or Internet routing devices for Internet traffic. Additionally, MPLS is used to relay data packets from FIBs to tunnels and vice versa (e.g., encapsulation). Of course it is readily apparent, that any standard, model, protocol, and/or combination of protocols can be used to achieve the teachings of the present disclosure. All such variations are intended to fall within the broad scope of the present invention.

VRPs are unique modules in the present invention that are associated with a single VPN site. They are not directly associated with a VPN interface (e.g., PE-CE links defined in RFC2547). Rather, a VPN interface is associated with a VRF. Multiple VRPs can reside in a single VRF and share the same RIB and FIB, thus enabling multiple VPNs for a VPN interface by making use of a single RIB and FIB at the PE. Conversely, RFC2547 does associate a single VPN with a single VRFM, and a VPN interface with a single VRFM, thereby restricting a VPN interface of a customer to participate in a single VPN. For a customer site to participate in multiple VPNs, RFC2547 requires multiple VRFMs and hence multiple RIBs and FIBs.

Moreover, the use of the word "device" in the present disclosure need not be a single physical device, since it will be readily apparent to one of ordinary skill in the art upon reading the present disclosure that a plurality of physical devices can be logically associated as a single virtual device. Additionally, a "normalized interface" refers to a standard communication technique (e.g. Application Programming Libraries, link-layer protocols) used to communicate between a VRF and a PE backbone device of the present disclosure. The normalized interface can communicate control plane information (e.g. routes) directly to the PE backbone device and at the same time communicate data plane information (e.g., raw data packets) indirectly to the PE backbone device.

Figure 1:
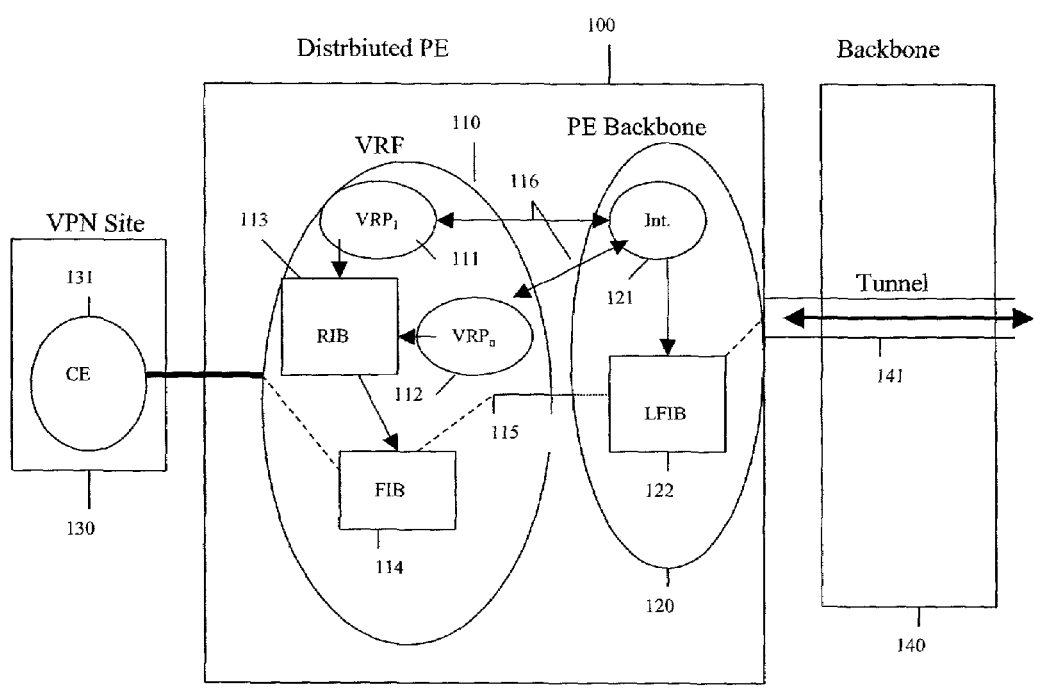
FIG. 1 shows a diagram of a distributed PE system, according to the present invention.

FIG. 1 illustrates a diagram of a distributed PE system 100, according to the present invention. The PE system 100 includes a Virtual Routing and Forwarding device 110 (VRF) having a plurality of VRPs (e.g., 111 and 112). Moreover, the VRF 110 includes a single RIB 112 and a single FIB 114. The PE system 100 also includes a PE backbone device 120 having an interface 121 and a Labeled Forwarding Table 122 (LFIB). The various components of the PE system 100 can be implemented on any computing device(s), such as a router(s), a switch(es), a virtual router(s), a host computing device(s), and others. For example, the PE system 100 can be implemented as any edge device(s) or components of any edge device(s) described in the IETF's Provider Provisioned VPNs Framework (e.g., PPVPN-FRMWRK). Moreover, the external interfaces/communication/protocols between the PE system 100 to a VPN site 130 (e.g., at CE 131) or to a backbone 140 (e.g., P systems/devices or PE systems/devices) can be the same as is defined by IETF standards. Therefore, the teachings of the present disclosure remain compliant with an IETF-based implementation.

A VRF 110 of the present disclosure is not restricted to a single VPN site 130. Multiple VPN sites (not shown in FIG. 1) can connect to a single VRF 110 as long as each of the VPN sites is participating in same VPN, this is consistent with IETF standards. Moreover, in the present disclosure multiple VPN sites 130 can connect to a single VRF 110 as long as the VPN site 130 is participating in one of the VPNs enabled by the VRF 110. In one embodiment of the present disclosure, the VRF 110 is associated with a single VPN site 130, the VPN site 130 includes a Customer Edge device 131 (CE) used to transfer and receive network traffic from the PE system 100. In one embodiment, the CE device 131 is a CE device defined by RFC2547. Moreover, the CE device 131 can be used to process all the VPNs occurring at the VPN site 130. Each VRP (e.g., 111 or 112) is associated with a single VPN from the VPN site 130.

Each VRP (e.g., 111 or 112) accesses the RIB 112 of the VRF 110 directly to update (e.g., import/export) routing information associated with a VPN. The VRP (e.g., 111 or 112) uses a control interface to a BGP module in order to relay (e.g., acquire/distribute) the routing information to/from other PE systems. The VRP (e.g., 111 or 112) provides the same functional interface to the BGP module as expected by it from the RIB 113 in RFC2547. The VRP (e.g., 111 or 112), by updating the RIB 113 or FIB 114, enables the VRF 110 to receive VPN data from the CE 131 or the PE backbone 120.

The PE backbone's interface 121 is used by each of the VRPs (e.g., 111 and 112). The interface 121 represents a control plane between the VRPs (e.g., 111 and 112) and the backbone 120. The interface 121 can be message based (e.g., asynchronous) or implemented as a functional Application Programming Interface (API) library accessible to both the PE backbone 120 and each of the VRPs (e.g., 111 and 112). The interface 121 can remain consistent with RFC2547 and other IETF standards.

Additionally, a data plane interface 115 is used to relay raw data packets from the VRF 110 and the PE backbone 120. This data plane interface 115 can include an identifier with the relayed data packets that permit the Labeled FIB 122 of the PE backbone to determine which VPN the data packets are originating from. As one of ordinary skill in the art readily recognizes, the data plane 115 can enable accounting and other network services (e.g., policy-based services, Network Address Translation (NAT) services, firewall services, proxy services, and the like) for all VPN traffic occurring in the PE system 100 and distinguish between the various types of VPN traffic (e.g., determine which VPN requires traffic to have services and policies instituted).

Unlike RFC2547, with the present invention the PE backbone 120 acquires addressing/routing information using BGP indirectly from one of the VRPs (e.g., 111 or 112) and not directly from a RIB 113. Additionally, multiple VRPs (e.g., 111 and 112) are embodied on a single VRF 110 and use the same RIB 112 and FIB 114. This provides an integrated solution that permits a single VPN site 130 to use a single VRF 110 to participate in multiple VPNs. Moreover, VPN interfaces and PE to CE interfaces are associated with the VRF 110 and not the VRPs (e.g., 111 and 112). In fact, any routing protocol operational on the VRF 110 can interact with other protocols, including each of the VRPs (e.g., 111 and 112) indirectly through the RIB 112 by importing and exporting routes. Thus, a single protocol instance could be used to provide routing information to the VPN site 130 (e.g. at the CE 131) for all VPNs.

Traffic received from the CE 131 and PE system 100 interfaces is used to access the VRF's FIB 114. If the traffic is outbound traffic then routes are sent to the PE backbone 120 using the interface 121. And, the data packets are sent to the PE backbone 120 using data plane interface 115. The data packets are sent as labeled packets (label stacking can be used) to the backbone 120. Similarly, traffic received by the backbone 120 is sent to the VRF as IP packets (e.g., not labeled) over the interface 121 (e.g., routes) and data plane 115 (e.g., data packets). Data can be forwarded using the VRF's FIB 114 to the VPN site 130.

The LFIB 122 is used by the PE backbone 120 for forwarding VPN data packets received at the PE backbone 120. For outbound traffic, a labeled entry lookup is performed against the LFIB 122. The lookup results in the traffic being forwarded on backbone 140 using tunnel 141. The tunnel 141 provides a path to another PE system 100 and another PE backbone device 120. The traffic is sent via the tunnel 141 as labeled packets. For inbound traffic, the labeled entry lookup in the LFIB 122 results in forwarding the traffic to an appropriate VRF 110 as IP packets (e.g., not labeled). Additionally, in some embodiments of the present invention, a LFIB 122 does not reside on the PE backbone 120, rather, a combination FIB/LFIB can be implemented on the VRF 110, in this way the PE backbone 120 is not required to do any lookup on received data packets.

As one of ordinary skill in the art now appreciates, mapping of multiple VPNs to a single VRF 110 is asymmetrical and unique with the present invention. A control data plane 115 associated with a backbone 120 is used to communicate data packets between the VRF 110 and the backbone 120. Moreover, VPN interfaces and CE to PE interfaces are associated with the VRF 110 and not the VRPs (e.g., 111 and 112). Interactions between the VRPs (e.g., 111 and 112) are achieved through the single RIB 112.

Figure 2:
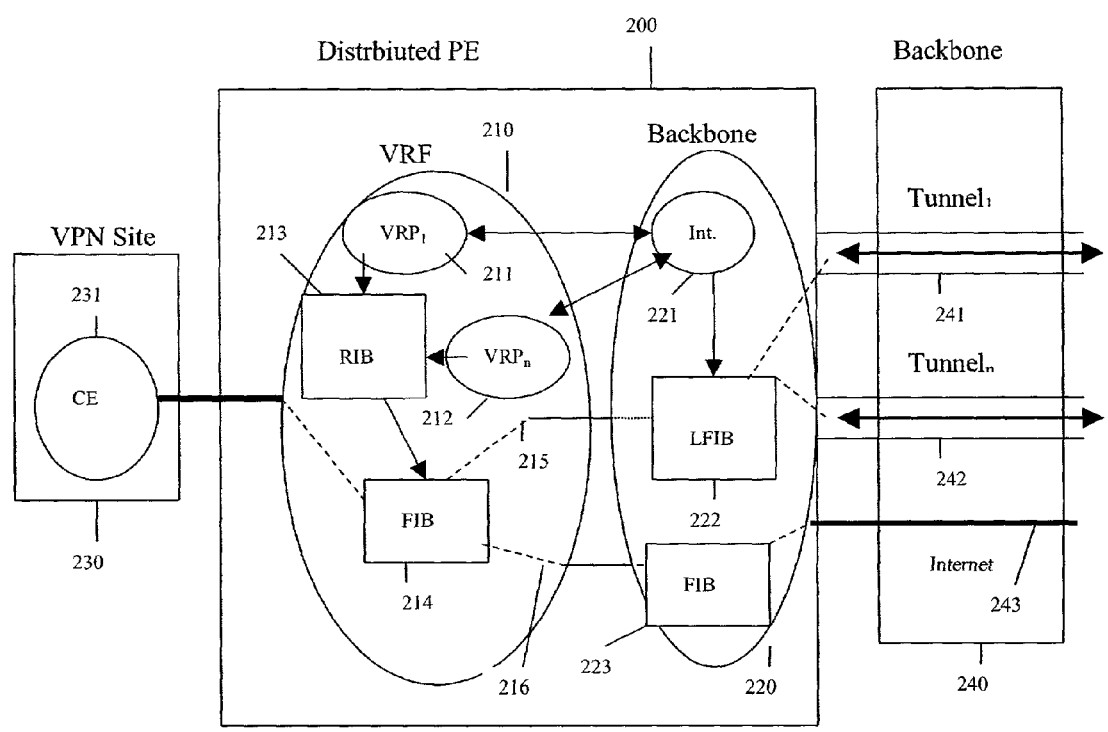
FIG. 2 shows another diagram of a distributed PE system, according to the present invention.

FIG. 2 illustrates another diagram of a distributed PE system 200, according to the present invention. The PE system 200 includes a VRF 210 having a plurality of VRPs (e.g., 211 and 212). The VRF also includes a single RIB 212 and a single FIB 214. Moreover, the PE system 200 includes a backbone device 220 having a first data plane 215 and a second data plane 216, a LFIB 222, and in some embodiments a FIB 223. The PE system 200 can be implemented using a single computing device, a plurality of computing devices, or a plurality of components of computing devices. The PE system 200 can also be compliant with IETF standards.

The PE backbone device 220 is interfaced to backbone 240, which includes a first tunnel 241 and a second tunnel 242. In some embodiments, backbone 240 also includes an Internet tunnel 243. Although, as one skilled in the art recognizes, the Internet tunnel is actually just an Internet connection, since data packets do not need to be labeled with Internet traffic. In this way, a FIB 220 can be used in some embodiments, within the PE backbone 220. The tunnels (e.g., 241–243) can be MPLS Labeled Switched Paths (LSPs), IP-Sec, or any other tunnel capable of carrying labeled packets.

Direct or indirect mapping of VPN routes can be used to route packets to one of the tunnels (e.g., 241–243). If indirect mapping is used, then a LFIB 222 lookup (e.g., swap or transform) is required for outbound VPN traffic.

The VRPs (e.g., 211 and 212) reside on the VRF 210; each VRP (e.g., 211 or 212) represents a separate VPN occurring within the VRF 210. Moreover, the VRF 210 communicates with a VPN site 230 having a CE device 231. The VRF uses a plurality of interfaces associated with the different VPNs and the CE to PE communications to interact with the CE 231.

Each of the VRPs (e.g., 211 and 212) has access to the first 215 and second data planes 216. Each data plane (e.g., 215 and 216) corresponds to data packets associated with a different type of VPN or Internet traffic. The VRPs (e.g., 211 and 212) communicate directly with the RIB 212 and indirectly with the FIB 214 to selectively determine which data plane (e.g., first 215 or second 216) to use when communicating with the PE backbone device 220. Control information (e.g., routes) is sent by the VRPs (e.g., 211 and 212) to the PE backbone's control interface 221.

In one embodiment, the first tunnel 241 is a first VPN and the second tunnel 242 is a second VPN. Moreover, in some embodiments, the first tunnel can be represented as an Internet connection 243 (e.g. destined for an Internet routing device on the Internet), and the second tunnel 242 is a VPN tunnel. Furthermore, in one embodiment, the first tunnel 241 is an Intranet tunnel and the second tunnel 242 is an Extranet tunnel. Of course a variety of tunnel communications can also be used with the present disclosure. All such tunnel combinations are included within the broad scope of the present invention. Moreover, each tunnel (e.g., 241–243) can have different services enabled or associated with them. For example, the Internet connection/tunnel 243 can include NAT services, firewall services, proxy services, and the like. In this way, the VRF 210 can detect the data plane (e.g., 215 or 216) and force the appropriate services or polices required for the received data packets. Additionally, if Internet and VPN traffic are using the same services and policies then a data plane 216 can be used to communicate between the PE backbone device 220 and the VRF 210.

As one of ordinary skill in the art now appreciates, various embodiments of PE system 200 can permit a single instance of a VRF 210 to support multiple disparate VPNs through the use of instances of different VRPs (e.g., 211 and 212) enabled on the single VRF 210. Moreover, secure Extranet and Intranet communications can be achieved for a single PE system 200 using multiple data planes (e.g., 215 and 216) between the VRPs (e.g., 211 and 212) and the PE backbone device 220 to select the appropriate tunnel (e.g., 241, 242, or 243). Further, a single VRF 210 can support both VPN traffic as well as Internet traffic. The flexible approach of PE system 100 also permits modifications (e.g., new instances of VRPs (e.g., 211 and 212) or new developed control planes, using new identifiers for the data packets) to be installed more easily into the PE system 200 when additional tunnels and networks are created/needed in the future.

Figure 3:
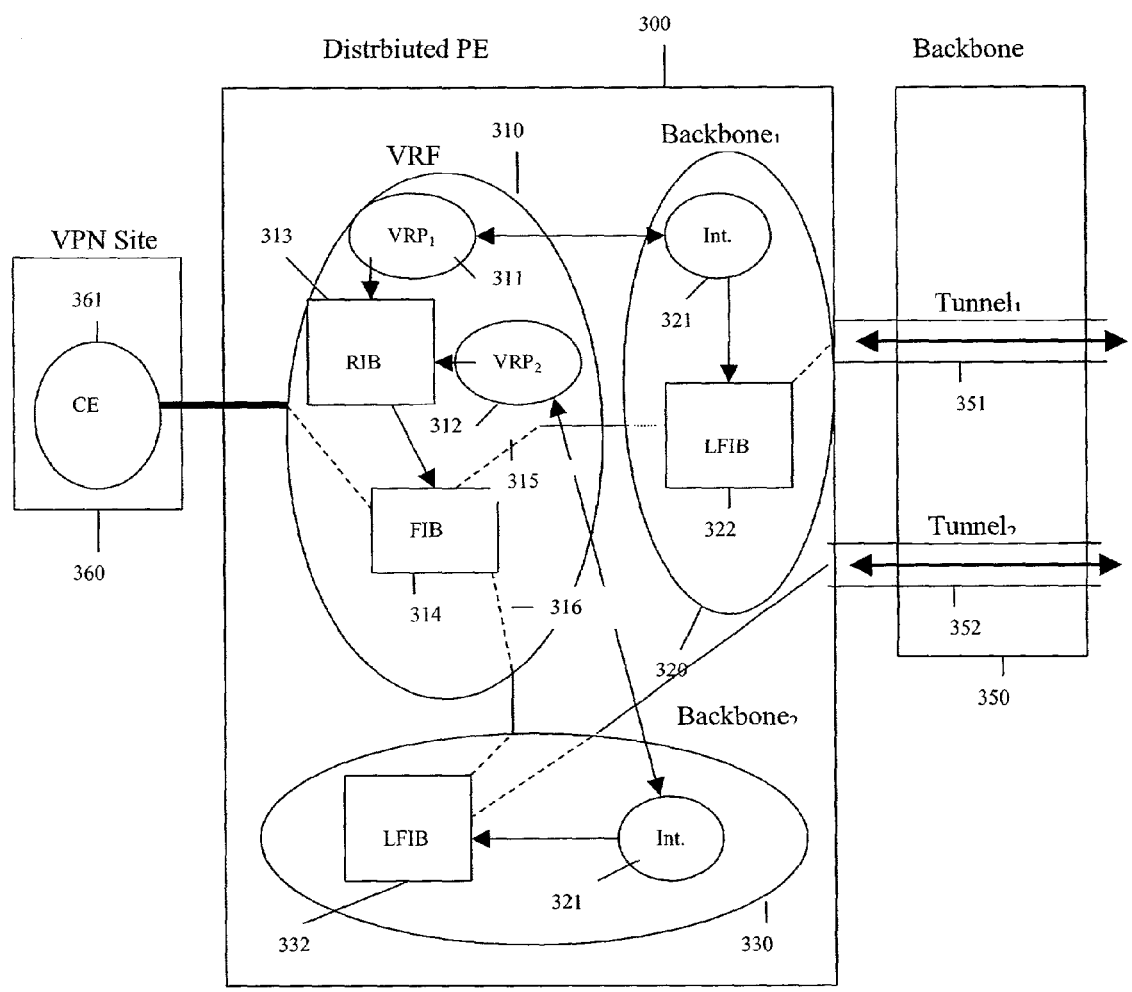
FIG. 3 shows still another diagram of a distributed PE system, according to the present invention.

FIG. 3 illustrates still another diagram of a distributed PE system 300, according to the present invention. The PE system 100 includes a VRF 310 having a first VRP 311 and a second VRP 312. The VRF 310 also includes a single RIB 312 and a single FIB 314. Furthermore, PE system 100 includes a first PE backbone device 320 associated with a first SP, and a second PE backbone device 330 associated with a second SP. The PE system 100 can be implemented and distributed across one or a plurality of computing devices, or on a plurality of components of computing devices. The PE system 100 can be virtual, physical, or a combination of both virtual and physical. Moreover, the PE system 100 can be compliant with IETF standards.

The PE backbone devices (e.g., 320 and 330) communicate with a backbone 350 having a first tunnel 351 and a second tunnel 352. The first PE backbone 320 uses the first tunnel 351 to communicate with the first SP. Similarly, the second PE backbone 330 uses the second tunnel 352 to communicate with the second SP.

The VRF 310 uses a plurality of VPN interfaces and CE to PE interfaces to communicate with a VPN Site 360 having a CE 360. The first VRP 311 is designed to directly access the RIB 312 to acquire route information associated with the first SP. This information is passed along to the first backbone 320 by using interface 321. Moreover, the data packets are relayed to the first PE backbone 320 using a first data plane 315 with an identifier. The identifier is then used to lookup forwarding information in a LFIB 322. A determination is made that the data packets need to be relayed via the first tunnel 351 associated with the first SP.

The second VRP 312 is designed to directly access the RIB 312 to acquire route information associated with the second SP. This information is passed along to the second backbone 330 by using interface 321, Moreover, the data packets are relayed to the second PE backbone 330 using a second data plane 316 with an identifier. The identifier is then used to lookup forwarding information in a LFIB 332. A determination is made that the data packets need to be relayed via the second tunnel 352 associated with the second SP.

In some embodiments of PE system 300, the tunnels (e.g., 351 and 352) communicate with additional PE systems 300 having additional backbones (e.g., 320 and/or 330). Moreover, outbound traffic destined for one of the tunnels (e.g., 351 or 352) is sent as labeled data packets. Inbound traffic received by one of the backbones (e.g., 320 or 330) is forwarded to the VRPs (e.g., 311 and 312) as IP data packets. Additionally, in some embodiments, the backbones (e.g., 320 and 330) and the VRF 310 are enabled with BGP for importing and exporting routes from the RIB 312 directly and indirectly from the FIB 314.

PE system 300 permits a single VRF 310 associated with a CE 361 to handle network traffic associated with multiple SPs. This permits a single VPN customer the opportunity to use multiple SP backbone providers. Thus, a single customer site can allow multiple participants into a VPN, where the multiple participants each use a different SP to connect and communicate with the VPN. Additionally, this functionality cannot be provided with RFC2547.

Figure 4:
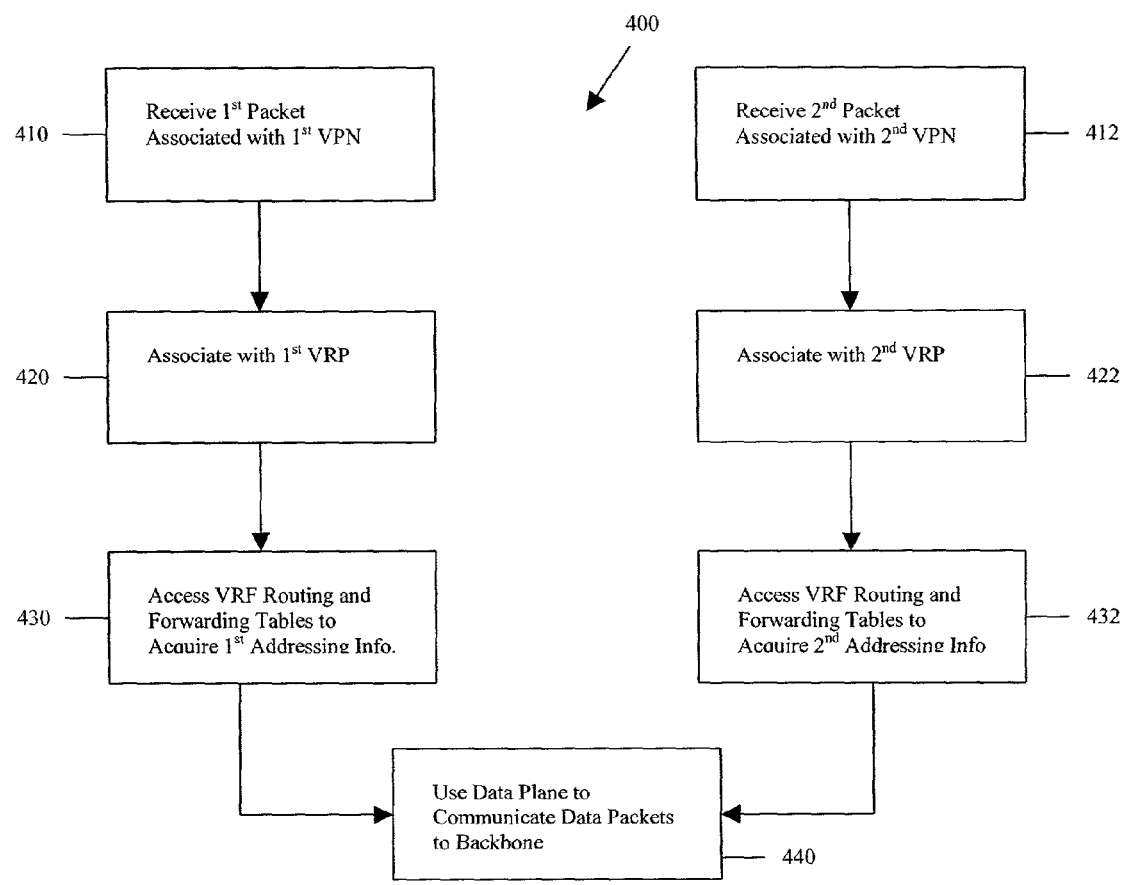
FIG. 4 shows a flow diagram of a method for processing network traffic on a distributed PE, according to the teachings of the present invention.

FIG. 4 illustrates a flow diagram of one method 400 for processing network traffic on a distributed PE, according to the teachings of the present invention. Initially, in 410, a first data packet is received at a PE device. The first data packet is associated with a first VPN transaction from a customer site. Concurrently, in 412, a second data packet is received at the PE. The second data packet is associated with a second VPN transaction from the customer site.

In 420, the first data packet is associated with a first VRP. The first VRP resides on a VRF. The VRF interfaces with a CE at the customer site. Moreover, in 430, the first VRP acquires first addressing/routing information about the first data packet through a single RIB residing on the VRF. Also, the RIB indirectly provides the first VRP with information from a single FIB also residing on the VRF.

In 422, the second data packet is associated with a second VRP. The second VRP also resides with the first VRP on the VRF. Similarly, in 432, the second VRP acquires second addressing/routing information about the second data packet through the RIB directly and the FIB indirectly (e.g., through the RIB). In some embodiments, the first and second addressing/routing information is acquired by the VRPs by using BGP on the VRF to import and export routing information.

Both VRPs, in 440, use a single data plane associated with the VRF and a backbone device to communicate the first and second data packets from the VRF to the PE backbone device. Additionally, the PE backbone device can receive backbone data packets from one or more tunnels interfaced to the PE backbone device. In one embodiment, these backbone data packets are then located in the PE backbone's LFIB and relayed to either the first VRP of the second VRP via the control data plane.

In one embodiment, the association between the data packets and the appropriate VRP is asymmetric and unique. Moreover, in some embodiments, one or more additional data planes between the VRF and the backbone is provided, where each of the one or more additional data planes are associated with a different type of VPN. Some types of VPNs can include Extranets, Intranets, custom created VPNs, and the others. Additionally, a normalized Internet access data plane can be provided between the VRF and the backbone to permit Internet traffic with the VPN traffic to be sent via an Internet connection as a non-labeled data packet.

CONCLUSION

Methods and systems detailed provide a distributed PE. These methods and systems create permit the distribution of processing and workload of Virtual Routing and Forwarding to multiple devices by introducing a data plane between a VRF and a PE backbone device. The VRF includes a single RIB and FIB, but includes multiple instances of VRPs. Each VRP accesses the RIB and the FIB and communicates routing information via a control plane to the PE backbone device and data packets via the data plane to the PE backbone device.

Furthermore, multiple data planes can be instituted to permit integration of disparate networks over the VRF. For example, a data plane can be used for Internet communications, Intranet communications, and/or Extranet communications. In this way, a single VRF instituting a plurality of VRP instances can use a set of data planes to interface with a PE backbone device. The PE backbone device can then use a plurality of tunnels to communicate with additional PE systems or the Internet.

Moreover, a single VRF can be interfaced to two separate PE backbone devices using disparate SPs. This is achieved by having a single VRP instance for each PE backbone device within the VRF. The appropriate VRP uses the VRF's RIB to identify data packets associated with a particular SP. The VRPs then use data planes from the VRF to the appropriate PE backbone device in order to transfer the data packets. The PE backbone device then uses the appropriate SP's tunnel to communicate with the appropriate SP.

Although specific embodiments have been illustrated and described herein, it will be appreciated by one of ordinary skill in the art that any arrangement that is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A distributed Provider Edge (PE) system, comprising:
   a PE backbone device having a data plane;
   a Virtual Routing and Forwarding device (VRF) associated with a single customer site and having a single routing table and forwarding table;
   a plurality of Virtual Private Network (VPN) Routing and Protocol Modules (VRPs) residing on the VRF, each VRP communicates directly with the routing table and indirectly with the forwarding table; and
   wherein each VRP communicates with the PE backbone device through the data plane and each VRP is associated with a single customer VPN.

2. The PE system of claim 1, wherein a plurality of VPN interfaces is associated with the VRF.

3. The PE system of claim 1, wherein a plurality of VPN traffic communicating with the VRF use the single forwarding table.

4. The PE system of claim 1, wherein each VRP communicates with the single routing table by importing and exporting routes from the single routing table.

5. The PE system of claim 1, wherein the single forwarding table is used to forward traffic received by the VRF to the PE backbone device as labeled packets.

6. The PE system of claim 1, wherein the PE backbone device communicates via a tunnel to one or more additional PE backbones or an Internet router device for an Internet connection.

7. The PE system of claim 6, wherein the PE backbone forwards inbound traffic received from one or more of the additional PE backbones as Internet Protocol (IP) packets to one or more of the VRPs.

8. A distributed provider edge (PE) system, comprising:
   a PE backbone device that transmits data packets via a first tunnel and a second tunnel;
   a plurality of VPN Protocol Instance modules (VRPs) residing on a single Virtual Routing and Forwarding device (VRF), the VRF includes a routing table and a forwarding table, and the VRF is associated with a plurality of VPNs from a single customer site and each VRP is associated with one of the plurality of VPNs;
   a first data plane used by a number of the VRPs and the PE backbone device to communicate via the first tunnel;
   a second data plane used by a number of the VRPs and the backbone device to communicate via the second tunnel; and
   wherein the VRPs communicate directly with the routing table and indirectly with the forwarding table and selectively uses one of the data planes to communicate the data packets associated with the plurality of VPNs to the PE backbone device.

9. The PE system of claim 8, wherein the first tunnel is an Internet connection to an Internet router device and the second tunnel is a VPN tunnel.

10. The PE system of claim 8, wherein the first tunnel is first VPN tunnel and the second tunnel is a second VPN tunnel.

11. The PE system of claim 8, wherein the first tunnel is an Intranet tunnel and the second tunnel is an Extranet tunnel.

12. The PE system of claim 8, wherein different services are enabled for the data packets based on the selected data plane.

13. The PE system of claim 12, wherein the different services include at least one of a Network Address Translation (NAT) service and a firewall service.

14. A distributed Provider Edge (PE) system, comprising:
   a first PE backbone device associated with a first service provider (SP);
   a second PE backbone device associated with a second SP;
   a Virtual Routing and Forwarding device (VRF) associated with a plurality of Virtual Private Networks (VPNs) from a single customer site, the VRF includes a single routing table and forwarding table;
   a first VPN Protocol Instance module (VRP) residing on the VRF used to communicate with the first SP through the first PE backbone device;
   a second VRP residing on the VRF used to communicate with the second SP through the second PE backbone device; and
   wherein the VRPs use the routing and forwarding tables to communicate traffic from the plurality of VPNs to the PE backbones.

15. The PE system of claim 14, wherein each VRP uses a different data plane associated with the VRF to communicate data packets to the PE backbones.

16. The PE system of claim 14, wherein the PE backbones communicate the traffic via tunnels to one or more additional PE backbones.

17. The PE system of claim 16, wherein the traffic is outbound traffic destined for one of the tunnels and forwarded to the PE backbones as labeled data packets.

18. The PE system of claim 16, wherein inbound traffic is received from the PE backbones through one of the tunnels and forwarded to the VRPs as Internet Protocol (IP) data packets via one of the data planes.

19. The PE system of claim 14, wherein the PE backbones and the VRF are enabled with Border Gateway Protocol (BGP).

20. The PE system of claim 14, wherein the PE backbones and the VRF are virtual devices.

21. A method to process network traffic on a distributed Provider Edge (PE), comprising:
   receiving a first data packet at a PE, wherein the first data packet is associated with a first Virtual Private Network (VPN) transaction from a customer site;
   receiving a second data packet at the PE, wherein the second data packet is associated with a second VPN transaction from the customer site;

associating the first data packet with a first VPN Protocol Instance module (VRP), wherein the first VRP resides on a Virtual Routing and Forwarding device (VRF);

associating the second data packet with a second VRP, wherein the second VRP resides on the VRF;

accessing a single routing table and forwarding table located on the VRF to acquire first addressing information for the first data packet, wherein the tables are accessed by the first VRP;

accessing the tables located on the VRF to acquire second addressing information for the second data packet, wherein the tables are accessed by the second VRP; and using a data plane associated with the VRF to communicate the first and second data packets to a PE backbone device, wherein the first VRP and the second VRP use the data plane.

22. The method of claim 21 further comprising receiving PE backbone data packets that are relayed to the first VRP or the second VRP, wherein the PE backbone device receives the PE backbone data packets from a tunnel and uses the data plane to communicate the PE backbone data packets to the first VRP or the second VRP.

23. The method of claim 21, wherein in accessing the tables, the VRF uses Border Gateway Protocol to import and export the routing information from the routing table to the VRPs.

24. The method of claim 21, wherein in associating the data packets, the association between the data packets to the appropriate VRPs is asymmetric and unique.

25. The method of claim 21 further comprising providing one or more additional data planes for use by the VRPs and the PE backbone device, wherein each of the one or more additional data planes is associated with a different type of VPN.

26. The method of claim 25, wherein in providing, the types of VPNs include at least one of an Extranet and an Intranet.

27. The method of claim 21 further comprising providing an Internet data plane for use by the VRPs and the PE backbone device.

* * * * *